(12) United States Patent
Yamada et al.

(10) Patent No.: US 7,325,975 B2
(45) Date of Patent: Feb. 5, 2008

(54) OPTICAL MODULE WITH LEVER THAT ABUTS CASE TO RELEASE LATCH FROM LOCKING STATE WITH CAGE WHICH ACCOMMODATES OPTICAL MODULE

(75) Inventors: Yasushi Yamada, Tokyo (JP); Masayuki Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 299 days.

(21) Appl. No.: 10/844,500

(22) Filed: May 13, 2004

(65) Prior Publication Data
US 2004/0228582 A1 Nov. 18, 2004

(30) Foreign Application Priority Data
May 16, 2003 (JP) .............................. 2003-138660

(51) Int. Cl.
*G02B 6/40* (2006.01)
(52) U.S. Cl. ....................................................... 385/54
(58) Field of Classification Search ..................... None
See application file for complete search history.

(56) References Cited

U.S. PATENT DOCUMENTS

| | | | |
|---|---|---|---|
| 6,371,787 B1 | 4/2002 | Branch et al. | |
| 6,494,623 B1 * | 12/2002 | Ahrens et al. | 385/76 |
| 6,789,958 B2 * | 9/2004 | Ahrens et al. | 385/92 |
| 6,863,448 B2 * | 3/2005 | Chiu et al. | 385/88 |
| 6,929,403 B1 * | 8/2005 | Arciniegas et al. | 385/55 |
| 2001/0016442 A1 | 8/2001 | Stockhaus et al. | |
| 2002/0150344 A1 | 10/2002 | Chiu et al. | |
| 2002/0167793 A1 | 11/2002 | Branch et al. | |

FOREIGN PATENT DOCUMENTS

| | | |
|---|---|---|
| DE | 100 55 683 A1 | 5/2002 |
| JP | 7-209557 | 8/1995 |
| JP | 7-244230 | 9/1995 |

* cited by examiner

*Primary Examiner*—Ricky Mack
*Assistant Examiner*—Timothy Rude
(74) *Attorney, Agent, or Firm*—Young & Thompson

(57) ABSTRACT

An optical module has a lever for bending a spring plate possessed by a cage for accommodating a case of the optical module in a direction in which a retaining hole formed through the spring plate comes off a latch formed on the case. The lever has a shaft pivotably supported on the case, a tongue disposed on one side of the shaft, and an actuator disposed on the opposite side of the shaft with respect to the tongue. The lever pivotally moves about the shaft in response to a movement of the tongue toward the case, causing the actuator to press the spring plate to bend in the foregoing direction. A user can readily release the latch by moving the tongue toward the case, and withdraw the optical module from the cage through a simple manipulation of pulling the case out while holding the case and tongue together.

12 Claims, 14 Drawing Sheets

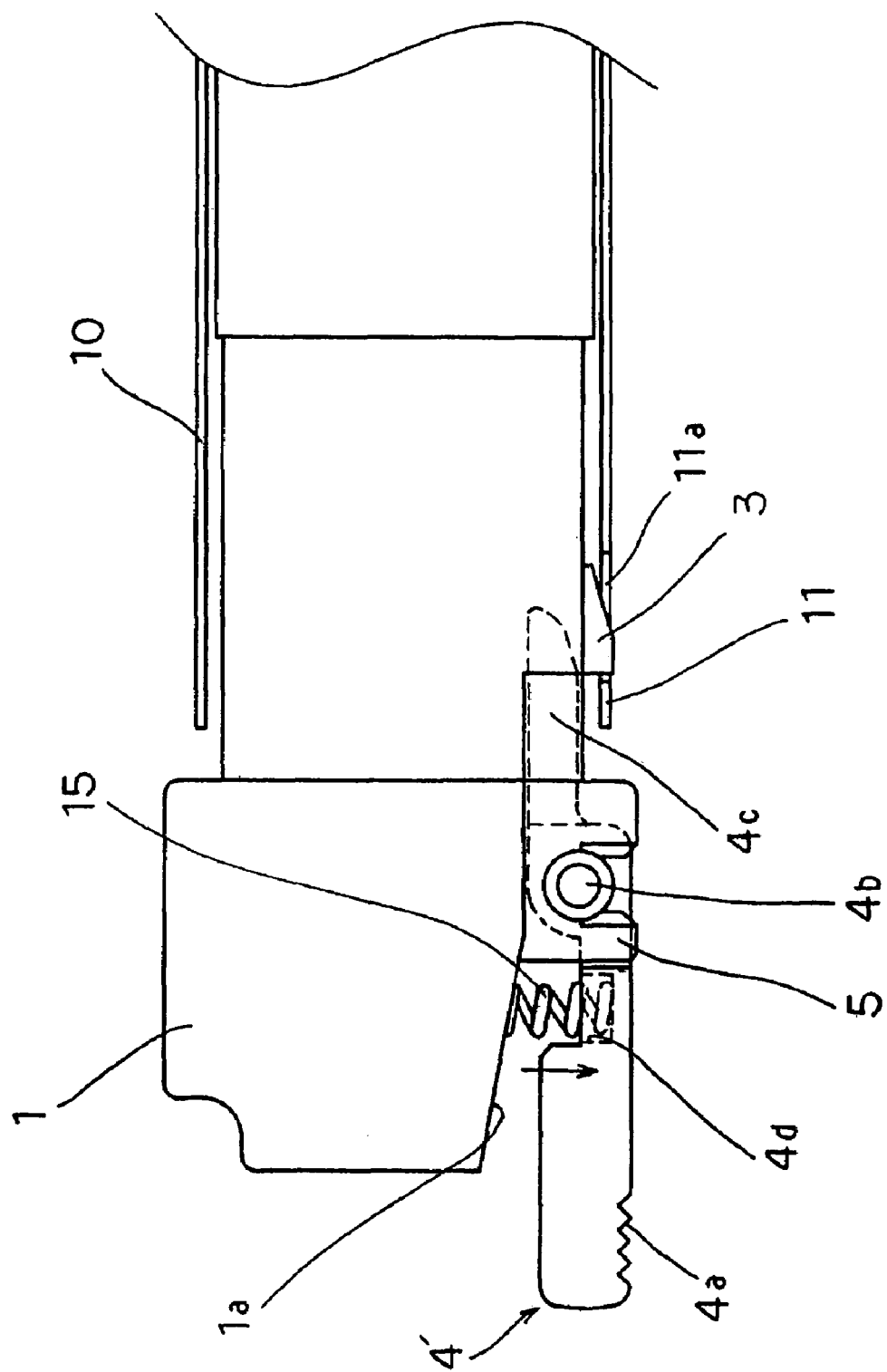

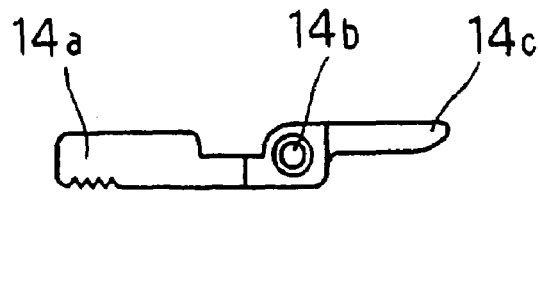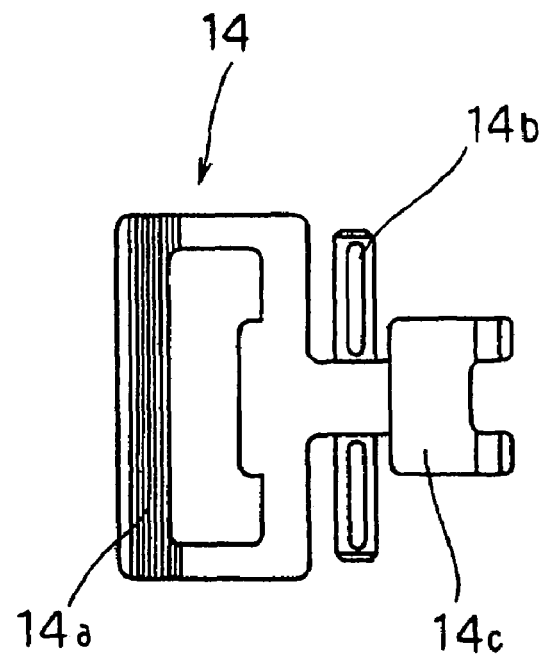
Fig. 12A
Fig. 12B
Fig. 12C

OPTICAL MODULE WITH LEVER THAT ABUTS CASE TO RELEASE LATCH FROM LOCKING STATE WITH CAGE WHICH ACCOMMODATES OPTICAL MODULE

BACKGROUND OF THE INVENTION

1. Field of the Invention

The present invention relates to an optical module for use in optical communications. More particularly, the present invention relates to an optical module which can be locked in a cage for accommodating the case of the optical module.

2. Description of the Related Art

Conventionally known optical modules for use in optical communications include an optical transceiver which comprises a light emitting element and a light receiving element for performing opto-electric conversion to make communications through optical fibers.

One type of such optical transceivers comprises an optical unit, including a light emitting element and a light receiving element, which is contained in a case, and is structured for removable accommodation in a cage mounted on a substrate. The case has an electric connector connected to the substrate, such that the optical transceiver plugged into the case causes its connection terminals to come into connection with the electric connector of the cage. The optical transceiver thus constructed converts an optical signal communicated to/from an optical fiber to an electric signal communicated to/from the substrate, and vice versa to enable optical communications.

However, if an optical transceiver is withdrawn from the cage during the operation of the optical transceiver, a communication device including the optical transceiver can fail, needless to say that a communication is interrupted in the middle. For this reason, the optical transceiver must be securely fixed within the cage at least during its operation.

In recent years, an industrial standardization organization has developed a standard called MSA (MultiSource Agreement) for SFP (Small Form-factor Pluggable) transceiver, by way of example, for making optical transceivers provided from respective companies compatible with one another. MSA defines the shape and dimensions of SFP transceivers and cages for accommodating the SFP transceivers. According to the SFP MSA standard, a protrusive latch is formed on the bottom surface of an optical transceiver, while a cage is provided with a spring plate formed with a retaining hole for retaining the latch therein, so that when the optical transceiver is inserted into the cage, the latch of the optical transceiver can fit into the retaining hole of the cage to lock the optical transceiver to the cage. On the other hand, for removing the optical transceiver from the cage, any means must be used to release the latch from the retaining hole of the spring plate to unlock the optical transceiver from the cage.

FIG. 1 is a perspective view illustrating a conventional optical transceiver disclosed in U.S. Pat. No. 6,434,015, with its bottom surface oriented upward.

The conventional optical transceiver illustrated in FIG. 1 comprises housing 101 for accommodating a light emitting element and a light receiving element and formed with latch 114; and ejector 170 for removing latch 14 from a retaining hole (not shown) of a cage. Ejector 170 is arranged in an ejector sheet formed in lower portion 111 of housing 101, such that depression onto push plate 179 arranged at the rear end of ejector 170 enables the leading end of ejector 170 to extend to the vicinity of latch 114 from within the ejector sheet. When the leading end of ejector 170 is protruded while latch 114 of the optical transceiver is retained in the retaining hole of the spring plate of the cage, the spring plate is bent to release latch 114 from the retention by the retaining hole.

Thus, this optical transceiver can be withdrawn from the case by pushing push plate 179 of ejector 170 in a direction indicated by an arrow A in FIG. 1 to protrude the leading end thereof to the vicinity of latch 114, and releasing latch 114 from the retention by the retaining hole formed through the spring plate of the cage.

However, An SFP optical transceiver conforming to the MSA standard should have a height of about 10 mm and a width of about 14 mm, i.e., the SFP optical transceiver itself is small in size, so that ejector 170 (see FIG. 1) disposed in such a small optical transceiver must be a miniature part. For this reason, it must be a finger tip (or a nail tip in some cases) that should depress push plate 179 of ejector 170 illustrated in FIG. 1. However, there is few clearance between the substrate on which the cage is mounted and the bottom surface of the optical transceiver, when the optical transceiver is mounted in the cage, so that the finger tip may not successfully reach the push plate 179 of ejector 170, thus experiencing difficulties in performing operations for unlocking the optical transceiver from the cage.

Also, the optical transceiver illustrated in FIG. 1 is withdrawn from the cage in a direction indicated by arrow B, which is opposite to the direction (the direction indicated by arrow A) into which ejector 170 is pushed. In other words, the conventional optical transceiver involves the unlocking operation and the removal of the optical transceiver from the cage in the direction opposite to each other, so that these operations must be performed independently of each other. Eventually, this optical transceiver disadvantageously entails a long time and many manipulations for removing the optical transceiver from the gage after the optical transceiver has been unlocked.

SUMMARY OF THE INVENTION

It is an object of the present invention to provide an optical module which can be readily released from a locking state in which a latch is retained in a retaining hole, and which permits a user to perform an unlocking operation and an operation for removing the optical module from a cage through simple manipulations.

According to one aspect of the present invention, an optical module of the present invention has a lever for bending a spring plate in a direction in which a retaining hole formed through a spring plate possessed by a cage is released from a latch of the optical module, wherein the lever includes a shaft pivotably supported on the case, a tongue disposed on one side of the shaft, and an actuator disposed on the opposite side of the shaft with respect to the tongue. The lever is configured to make a pivotal movement about the shaft in response to a movement of the tongue toward the case, such that the actuator presses the spring plate to bend in the direction.

Also, according to another aspect of the present invention, an optical module of the present invention has an unlocking member for bending a spring plate in a direction in which a retaining hole formed through a spring plate possessed by a cage is released from a latch of the optical module, wherein the optical module is configured such that the unlocking member bends the spring plate when the case and the unlocking member are held together, causing the retaining hole, in which the latch is retained, to come off the latch.

The unlocking member may include a lever having a shaft pivotably supported on the case, a tongue disposed on one side of the shaft, and an actuator disposed on the opposite side of the shaft with respect to the tongue, wherein the lever may be configured to make a pivotal movement about the shaft in response to a movement of the tongue toward the case, such that the actuator presses the spring plate to bend in the direction, and the case and the tongue may be held together with the tongue being moved close to the case.

In the optical module of the present invention, as the tongue of the lever is moved toward the case, the actuator of the lever bends the spring plate, so that the retaining hole, in which the latch is retained, can come off the retaining hole. Thus, the retention of the latch by the retaining hole can be released by holding the case and the tongue of the lever together, with the tongue of the lever positioned close to the case, and subsequently, the optical module can be withdrawn from the cage by pulling the case out while the case and the tongue are still being held. In this way, the optical module of the present invention permits the user to readily release the retention of the latch by the retaining hole only by moving the tongue of the lever toward the case, and also permits the user to withdraw the optical module from the cage only through a simple manipulation of pulling the case out while the user is holding the case and the tongue of the lever together.

Further, the latch and lever may be disposed on the same surface of the case, which is formed with a lever stopping surface to which the tongue abuts, and the lever may be configured to move the actuator to a position at which the retaining hole comes off the latch when the tongue comes into abutment to the lever stopping surface.

Also, the case may include a connection port on a front end surface thereof for connection with a connector which is connected to a cable, and the lever may be configured such that as the tongue is moved toward the case when the connector is in connection to the connection port, the tongue comes into abutment to the connector to prevent the actuator from moving to a position at which the retaining hole comes off the latch. With the foregoing configuration, the user is prevented from inadvertently operating the lever to cause the retaining hole to come off the latch while the connector is in connection to the connection port of the case. It is therefore possible to obviate the user from withdrawing the optical module from the cage in course of communication with the connector connected to the case, and therefore prevent an interrupted communication in the middle and a failure in the optical module.

The latch and lever may be arranged on a bottom surface of the case, and the tongue may have a weight larger than the weight of the actuator. Generally, the cage is mounted horizontally on a substrate, so that the optical module is accommodated in the cage in a horizontal posture. Therefore, when the optical module is accommodated in the cage, the lever is in a posture horizontal to the case, where the tongue falls while the actuator rise. This posture prevents the actuator of the lever from abutting to the spring plate when the optical module is inserted into the cage.

The optical module may further include an urging member for urging the lever in a direction in which the tongue is moved away from the case, wherein the lever can be maintained in a posture horizontal to the case in whichever posture the optical module takes, thereby making it possible to prevent the actuator of the lever from abutting to the spring plate when the optical module is inserted into the case.

The optical module accommodated in the cage may be withdrawn from the cage in a direction forward of a front end surface of the case, wherein the lever may be movable over a range within a region forward of the front end surface of the case. Further, the lever may be movable over a range within a region delimited by an extension of a top surface of the case forward of the front end surface of the case and an extension of a bottom surface of the case forward of the front end surface of the case.

When the movable range of lever exceeds the region forward of the front end surface of the case, wider intervals must be ensured in consideration of the movable range of the lever in order to mount a plurality of optical modules in a device, so that the optical modules cannot be mounted at a high density. However, when the movable range of the lever is limited within the foregoing region forward of the case, the movable range of the lever need not be taken into consideration when the optical modules are mounted in a device, thus making it possible to arrange the optical modules at narrower intervals and consequently mount a plurality of optical modules at a higher density in the device.

In a method of releasing an optical module from a locking state with a cage for accommodating the optical module according to the present invention, the optical module includes a lever for bending a spring plate possessed by the case in a direction in which a retaining hole formed through the spring plate is released from the latch, and the lever has a shaft pivotably supported on the case, a tongue disposed on one side of the shaft, and an actuator disposed on the opposite side of the shaft with respect to the tongue. The method includes the steps of moving the tongue toward the case, pivotally moving the lever about the shaft such that the actuator presses the spring plate to bend in the direction, and releasing the retaining hole in which the latch is retained from the latch.

In another method of releasing an optical module from a locking state with a cage according to the present invention, the optical module includes a case for containing elements for making optical communications, and the optical module has an unlocking member for bending a spring plate possessed by the cage in a direction in which a retaining hole formed through the spring plate is released from a latch of the optical module. For releasing the optical module from a locking state with the cage in which the optical module is accommodated, the method includes the steps of holding the case and unlocking member together, bending the spring plate with the unlocking member, and releasing the retaining hole in which the latch is retained from the latch.

The unlocking member may have a lever having a shaft pivotably supported on the case, a tongue disposed on one side of the shaft, and an actuator disposed on the opposite side of the shaft with respect to the tongue. The step of holding the case and the unlocking member together may include holding the case and the tongue together with the tongue positioned close to the case. Also, the step of bending the spring plate with the unlocking member may include pivotally moving the lever about the shaft, causing the actuator to press the spring plate to bend in the direction.

According to the methods of the present invention, the user can readily release the retention of the latch by the retaining hole only by moving the tongue of the lever toward the case, and can also withdraw the optical module from the cage only through a simple manipulation of pulling the case out while the user is holding the case and the tongue of the lever together.

The above and other objects, features and advantages of the present invention will become apparent from the following description with reference to the accompanying drawings which illustrate examples of the present invention.

BRIEF DESCRIPTION OF THE DRAWINGS

FIG. 9 is a diagram illustrating a second embodiment of the optical module according to the present invention;

FIGS. 12A-12C are diagrams illustrating a lever in a third embodiment of the optical module according to the present invention;

DESCRIPTION OF THE PREFERRED EMBODIMENTS

First Embodiment

Figure 1:
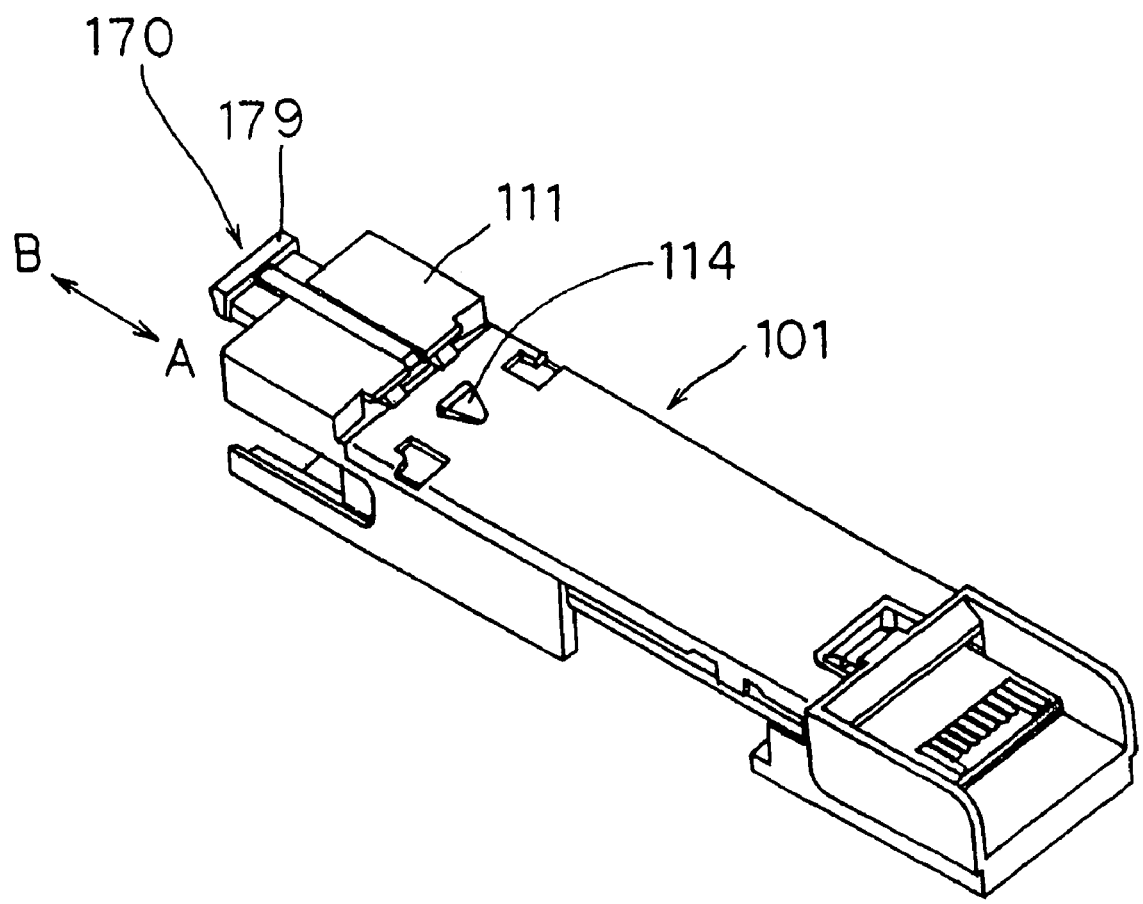
FIG. 1 is a perspective view illustrating a conventional optical transceiver with its bottom surface oriented upward.
Figure 2A:
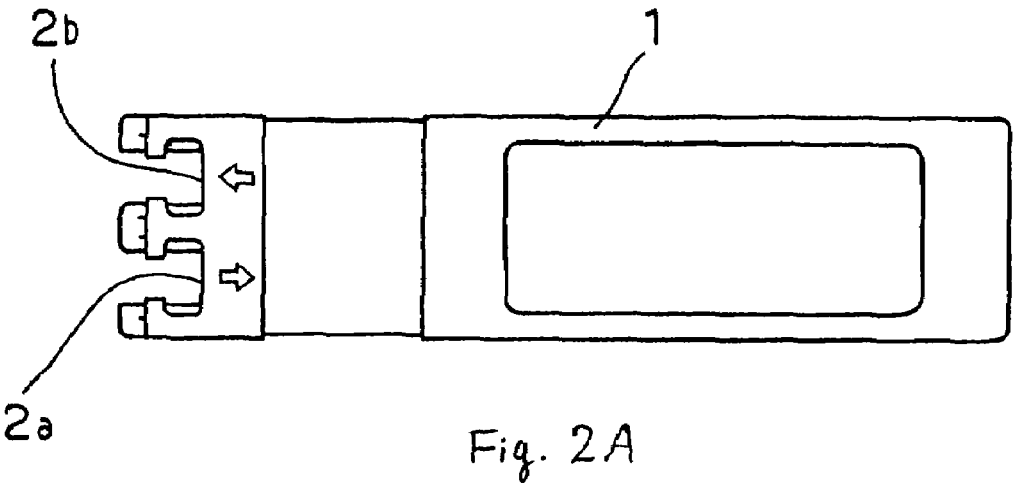
FIGS. 2A-2C are diagrams illustrating a first embodiment of an optical module according to the present invention.
Figure 2B:
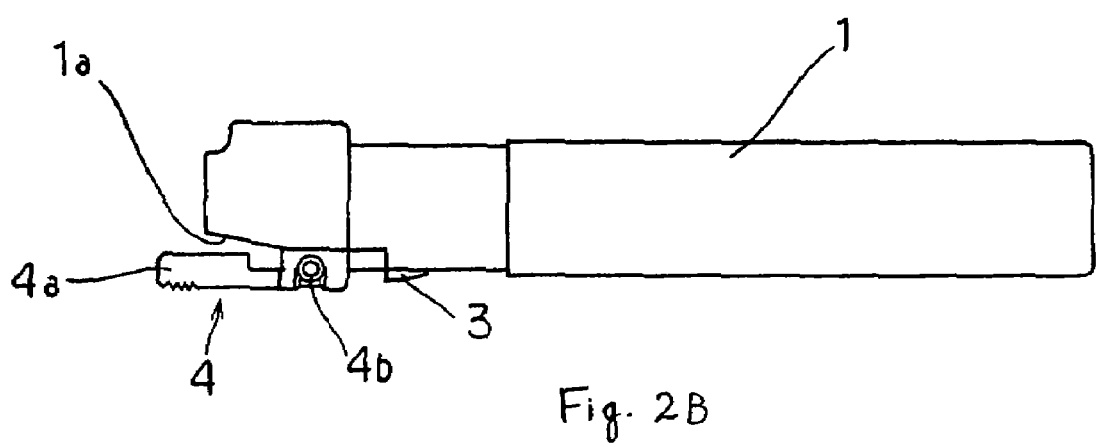
Figure 2C:
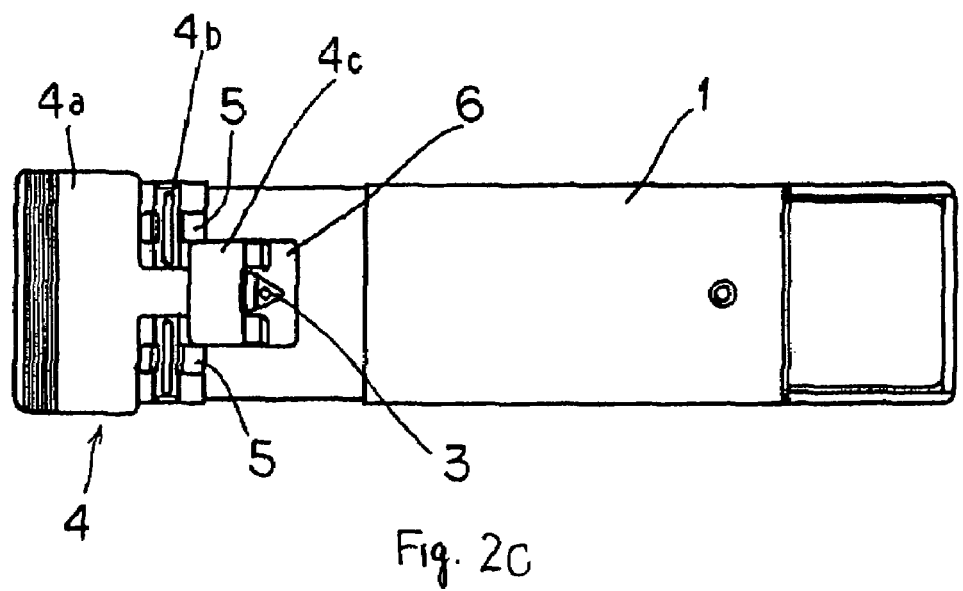
Figure 3A:
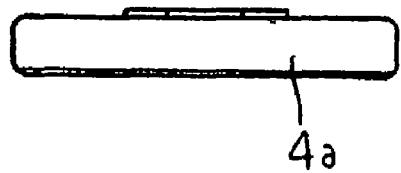
FIGS. 3A-3C are diagrams illustrating a lever in FIGS. 2A-2C.
Figure 3B:
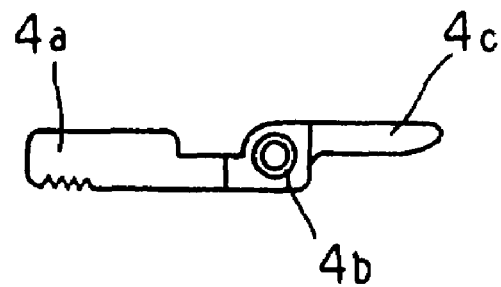
Figure 3C:
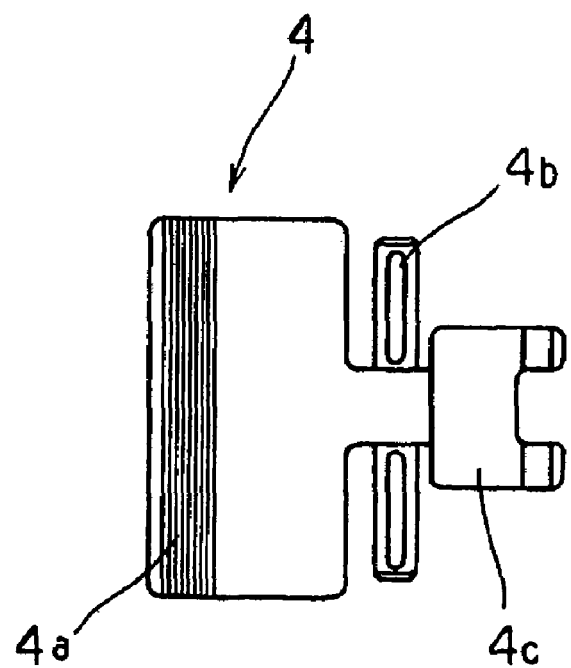

FIGS. 2A-2C are diagrams illustrating a first embodiment of an optical module according to the present invention, where FIG. 2A is a top plan view of the optical module, FIG. 2B is a front view of the same, and FIG. 2C is a bottom view of the same. FIGS. 3A-3C are diagrams illustrating a lever in FIGS. 2B and 2C, where FIG. 3A is a left side view of the lever, FIG. 3B is a front view of the same, and FIG. 3C is a bottom view of the same.

As illustrated in FIGS. 2A-2C, the optical module of this embodiment comprises case 1 which defines the shape of the optical module; and lever 4 attached to the bottom of case 1 near a front end surface. Case 1 contains an optical unit which includes a light emitting element and a light receiving element such as a laser diode (LD) and a photodiode (PD). Case 1 also has connection terminals disposed on a rear end surface thereof (right end surface as illustrated in FIGS. 2A-2C) for connection to an electric connector within cage 10 (see FIG. 4), later described, when case 1 is inserted into cage 10.

Case 1 also has two connection ports 2a, 2b which are open on the front end surface thereof for connection with connectors (not shown) of optical fiber cables. By inserting connectors of optical fiber cables into connection ports 2a, 2b, the connectors of the optical fiber cables can be connected to the optical module. Out of two connection ports 2a, 2b, input connection port 2a is provided for connection with a connector of an optical fiber cable through which optical signals are applied to the optical module, while output connection port 2b is provided for connection with a connector of an optical fiber cable through which optical signals are delivered from the optical module to the outside.

While this embodiment illustrates an optical module for use in transmission/reception of optical signals, the optical module according to the present invention also includes one for use in any of transmission, reception, and transmission/reception of optical signals. There is no limitation to the number of connection ports formed on the front end surface of case 1.

On the bottom surface of case 1, latch 3 is formed such that it is fitted into retaining hole 11a (see FIG. 4) of cage 10 when case 1 is inserted into cage 10. Recess 6 is formed around latch 3 on the bottom surface of case 1 for receiving actuator 4c of lever 4.

Referring now to FIGS. 3A-3C, lever 4 comprises tongue 4a which acts as a power point that is applied with a force when the user moves lever 4 with a finger; shaft 4b which acts as a fulcrum supported by case 1; and actuator 4c which acts as a load center for pushing down spring plate 11, later described. A plurality of narrow grooves may be formed on the bottom surface of tongue 4a as an antislip when the user touches tongue 4a with a finger. Actuator 4c has a leading end formed in an indented shape to surround three sides of latch 3 when lever 4 is attached to case 1. Lever 4 in this embodiment is designed such that a portion including tongue 4a from shaft 4b is heavier than a portion including actuator 4c.

Lever 4 may be fabricated, for example, by a molding or die cast method or the like such that tongue 4a, shaft 4b, and actuator 4c are integrally formed. A material suitable for lever 4 may be resin such as PPS (polyphenylene sulphide), or metal such as zinc, aluminum, or the like.

Referring again to FIGS. 2B and 2C, shaft 4b of lever 4 is pivotably supported by shaft presser foot 5 disposed on the bottom surface of case 1. This permits lever 4 to make pivotal movements about shaft 4b.

Figure 4:
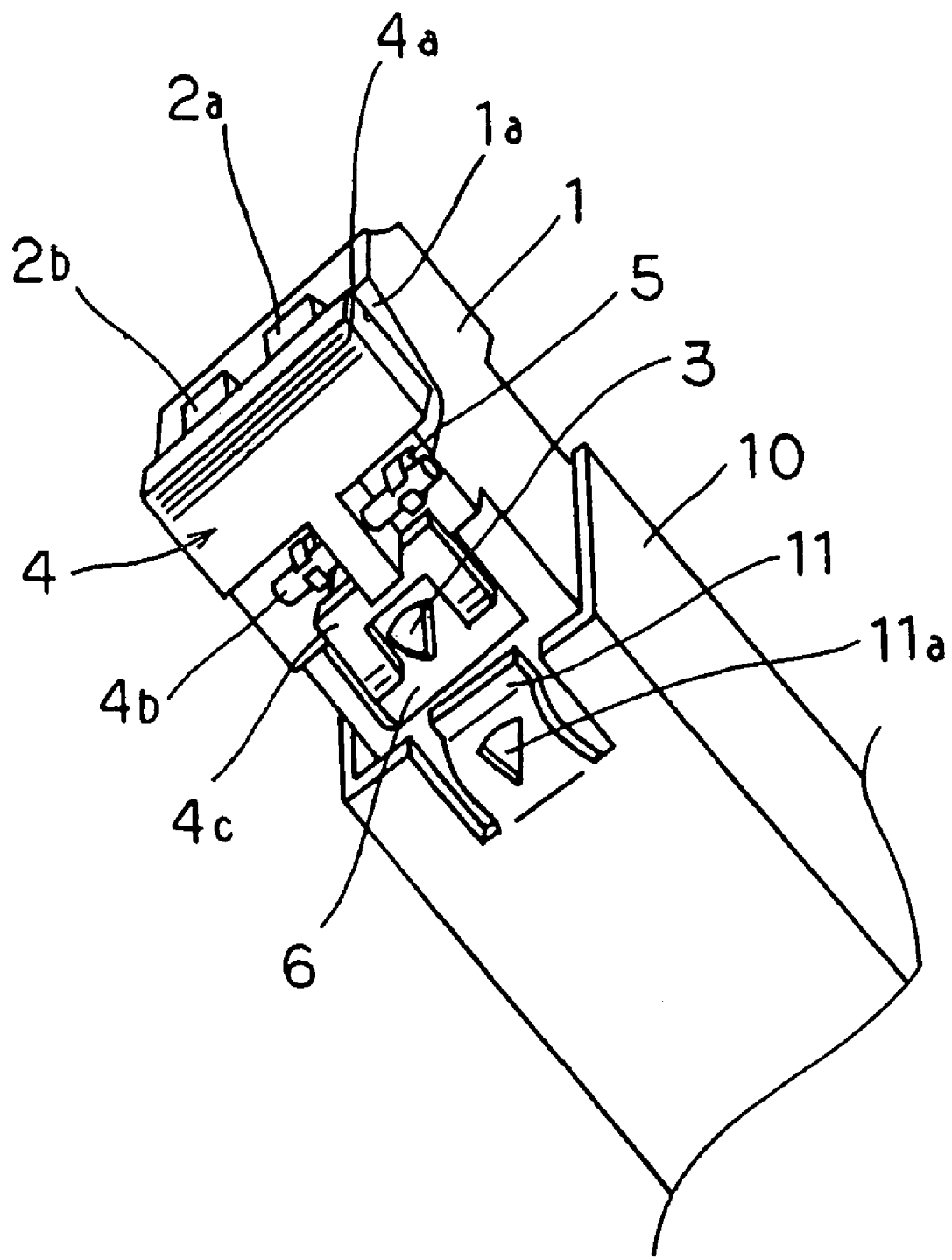
FIG. 4 is a perspective view, seen from below, showing how the optical module illustrated in FIGS. 2A-2C is inserted into a cage.

FIG. 4 is a perspective view illustrating the optical module shown in FIGS. 2A-2C, when it is inserted into the case, as viewed from below.

As illustrated in FIG. 4, spring plate 11 is attached to the bottom surface of cage 10 for accommodating the optical module. Spring plate 11 is formed with retaining hole 11a for retaining latch 3 of case 1 therein. Retaining hole 11a is arranged at a position at which latch 3 is retained thereby when case 1 is fully inserted into cage 10.

Cage 10, which is placed on a substrate (not shown), has an electric connector (not shown) connected to the substrate on a rear end portion within cage 10. This electric connector comes into connection with a connector (not shown) disposed on the rear end surface of case 1 when case 1 is fully inserted into cage 10.

Cage 10 may be made by bending a plate made of metal, for example, stainless steel or the like. Likewise, case 1 may also be made by bending a plate made of metal such as stainless steel. Alternatively, case 1 may be fabricated by molding using resin such as PPS (polyphenylene sulphide), or fabricated by a die cast method using metal such as zinc, aluminum, or the like, as is the case with lever 4.

Figure 5:
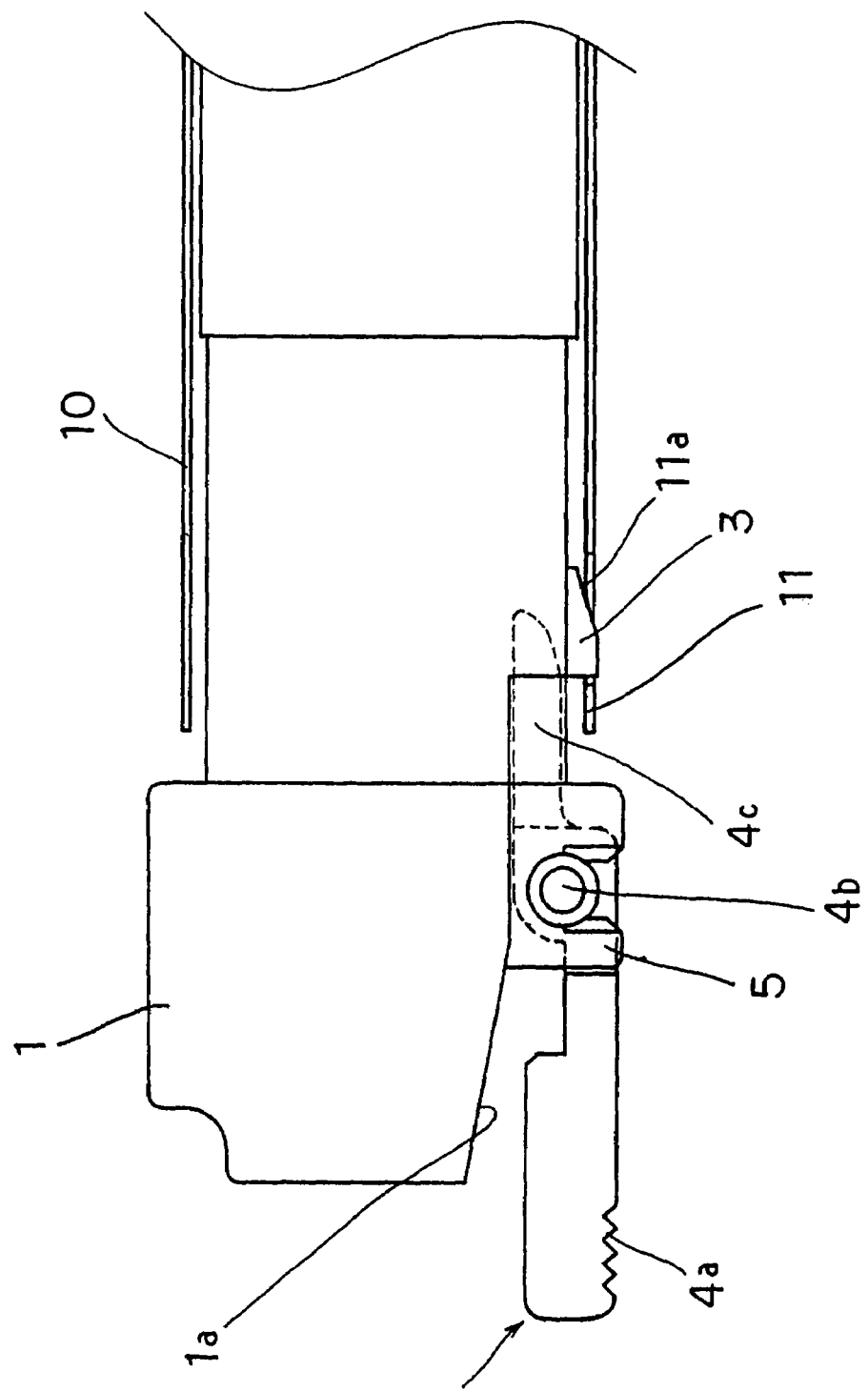
FIG. 5 is a diagram illustrating a case which has a latch retained in a retaining hole of the gage.
Figure 6:
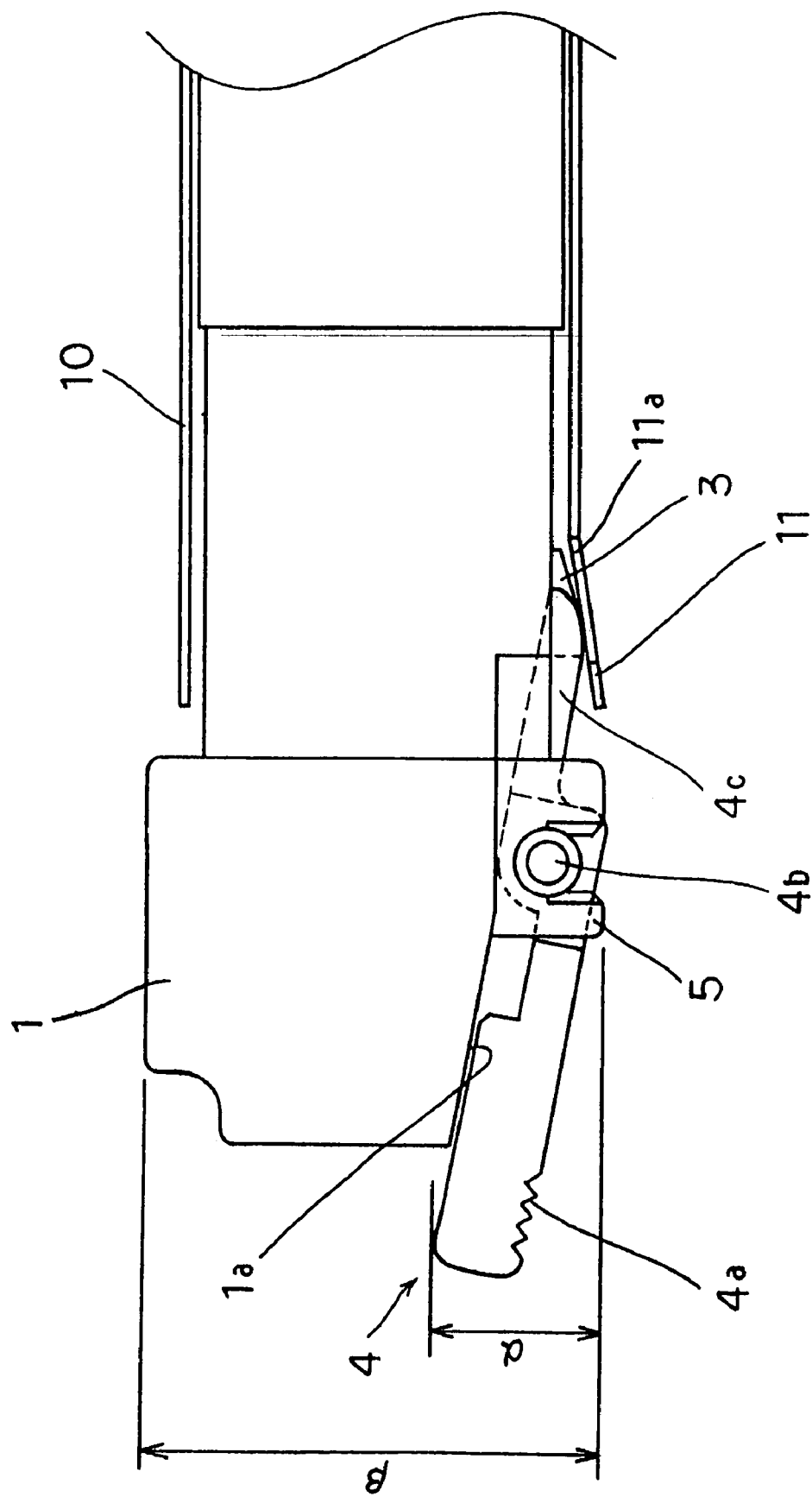
FIG. 6 is a diagram illustrating the case which has the latch released from retention by the retaining hole of the case.

FIG. 5 is a diagram illustrating latch 3 of case 1 which is retained by retaining hole 11a of cage 10, and FIG. 6 is a diagram illustrating latch 3 which is released from the retention by retaining hole 11a. As can be seen, FIGS. 5 and 6 depict some components in perspective.

As illustrated in FIG. 5, when latch 3 of case 1 is retained by retaining hole 11a of cage 10, the optical module is fully accommodated in cage 10.

Cage 10 is generally mounted horizontally on the substrate, so that the optical module is accommodated in cage 10 in a horizontal posture. As described above, since lever 4 is designed to have the portion including tongue 4a from shaft 4b heavier than the portion including actuator 4c, lever 4 takes a posture horizontal to case 1, where tongue 4a falls while actuator 4c rises, as illustrated in FIG. 5, when the optical module is accommodated in cage 10. In this event, actuator 4c of lever 4 is fitted into recess 6 (see FIGS. 2C and 4) formed on the bottom surface of case 1, and therefore will not come into abutment to spring plate 11.

As tongue 4a is lifted up from the state illustrated in FIG. 5, lever 4 is rotated about shaft 4b until the top surface of tongue 4a comes into abutment to lever stopping surface 1a formed on the bottom surface of case 1 in a front portion, as illustrated in FIG. 6, causing actuator 4c to project from recess 6 on the bottom surface of case 1 to move retaining hole 11a of spring plate 11 to a position at which retaining hole 11a comes off latch 3. Consequently, spring plate 11 of cage 10 is pushed down by actuator 4c to bend, and retaining hole 11a, in which latch 3 is retained, comes off latch 3, thereby releasing latch 3 from the retention by retaining hole 11a. Thus, in this state, case 1 can be withdrawn from cage 10 for removal.

As lever 4 is lifted up when optical fiber cable connectors are in connection to connection ports 2a, 2b, tongue 4a comes into abutment to the connectors before it abuts to lever stopping surface 1a. Therefore, actuator 4c will not move to the position at which retaining hole 11a of spring plate 11 comes off latch 3. With this structure, the user is prevented from inadvertently operating lever 4 to cause retaining hole 11a to come off latch 3 while connectors are in connection to connection ports 2a, 2b of case 1. It is therefore possible to obviate the user from withdrawing optical module from cage 10 in course of communication with connectors connected to case 1, and therefore prevent an interrupted communication in the middle and a failure in the optical module.

Figure 7:
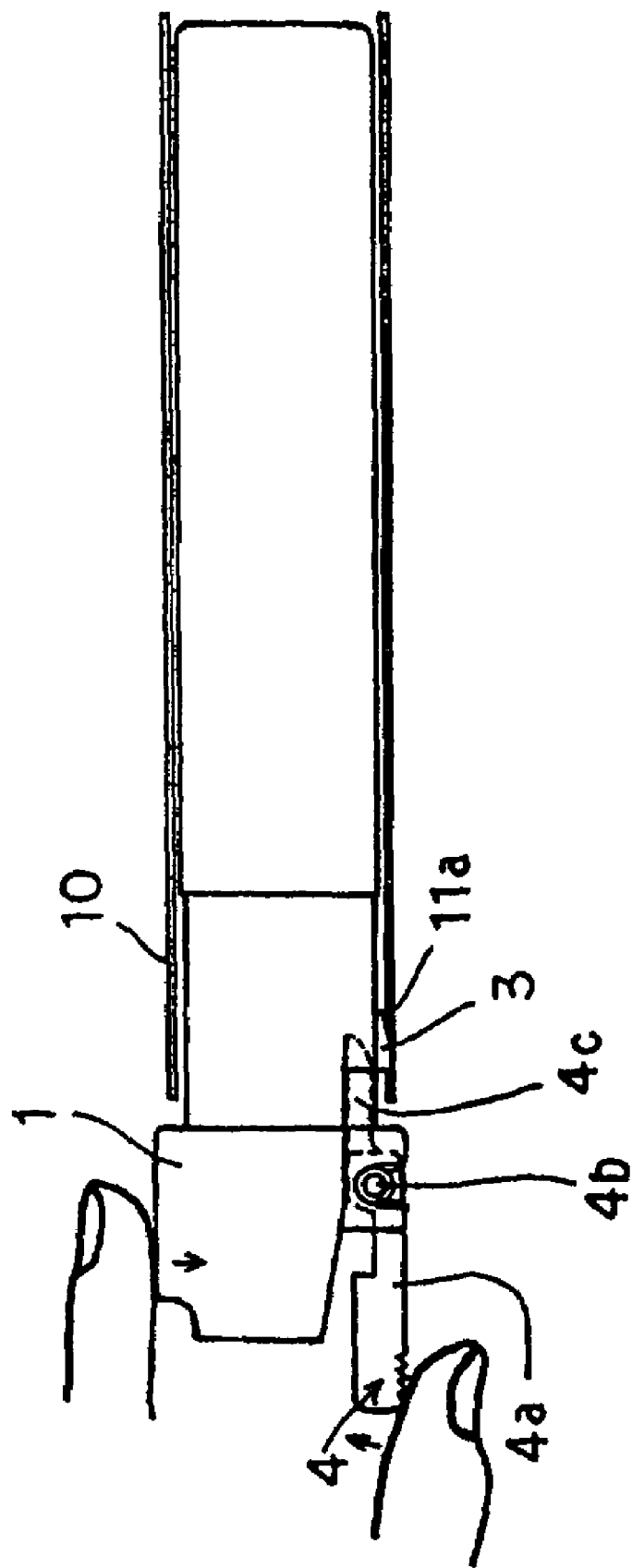
FIG. 7 is a diagram for describing how to hold the case and lever when the case is withdrawn from the cage.

Referring now to FIG. 7, an example will be described as to how to hold case 1 and lever 4 when case 1 is withdrawn from cage 10.

As illustrated in FIG. 7, the user preferably holds case 1 together with tongue 4a to hold case 1 of this embodiment, with the bottom surface of tongue 4a of lever 4 being supported by a thumb, and the top surface of case 1 being pushed down in a front portion with an index. In this way, case 1 and lever 4 can be firmly held together while tongue 4a of lever 4 is in abutment to lever stopping surface 1a of case 1. Thus, since case 1 can be withdrawn from cage 1 while entire case 1 is supported in a stable manner, case 1 and cage 10 are free from an inadvertent external force applied thereto, which would result in a damage, upon withdrawal of case 1.

In this embodiment, lever 4 is made movable within a range indicated by "α" in FIG. 6, which is within a region forward of the front end surface of case 1, and within a region between an extension of the top surface of case 1 in front of the front end surface and an extension of the bottom surface of case 1 forward of the front end surface (a range indicated by "β" in FIG. 6).

With the movable range of lever 4 exceeding the β region forward of the front end surface of case 1, when a plurality of optical modules are mounted in a single device, the optical modules must be arranged at wider intervals in consideration of the movable range of lever 4, so that the optical modules cannot be mounted at a high density. However, when the movable range of lever 4 is limited within the β region forward of case 1, the movable range of lever 4 need not be taken into consideration when the optical modules are mounted in a device, thus making it possible to arrange the optical modules at narrower intervals and consequently mount a plurality of optical modules at a higher density in the device.

Next, a sequence of operations for withdrawing the foregoing optical module from cage 10 will be described with reference to FIGS. 8A-8C.

Figure 8A:
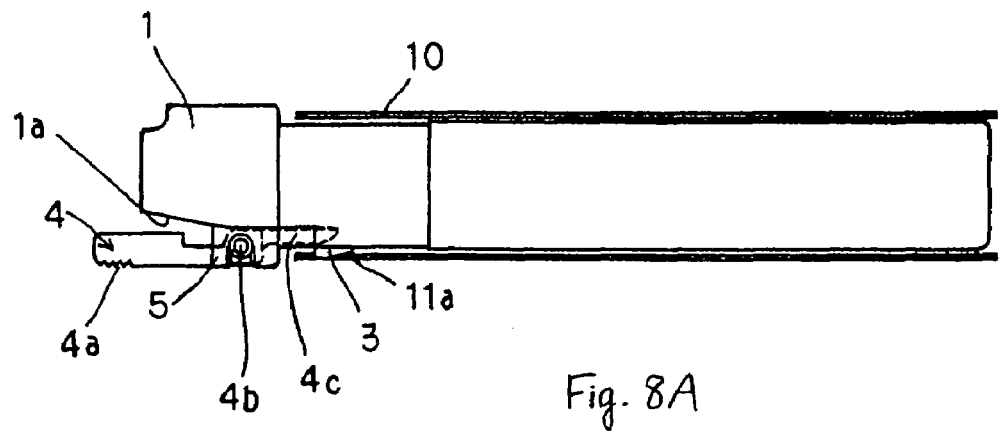
FIGS. 8A-8C are diagrams for describing a sequence of operations for withdrawing the optical module illustrated in FIGS. 2A-2C and the like from the cage.

FIG. 8A illustrates case 1 of the optical module accommodated in cage 10, wherein latch 3 on the bottom surface of case 1 is retained by retaining hole 11a. Lever 4 in turn is maintained at a horizontal posture, with its actuator 4c received in recess 6 (see FIG. 2C) on the bottom surface of case 1.

Figure 8B:
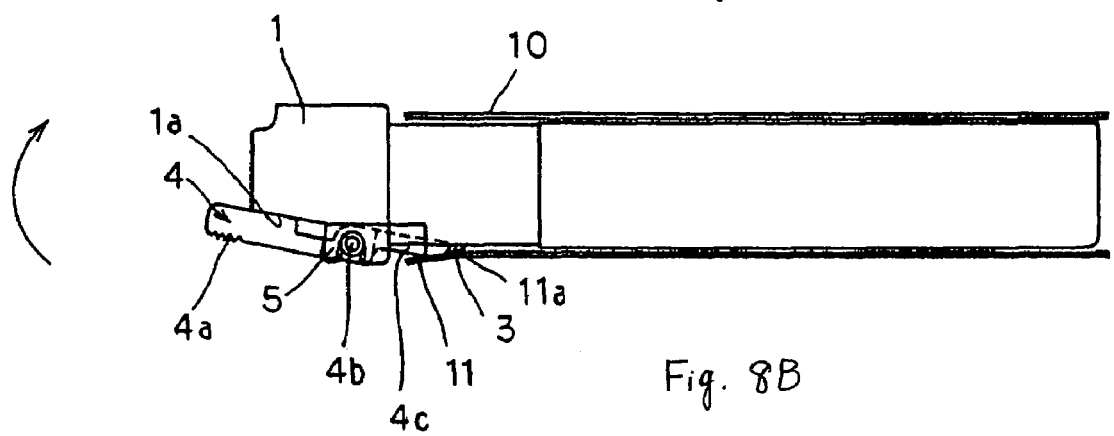

As tongue 4a of lever 4 is raised from the illustrated state until tongue 4a comes into abutment to lever stopping surface 1a, as illustrated in FIG. 8B, lever 4 pivotally moves about shaft 4b, causing actuator 4c to project from recess 6 of case 1 and push down spring plate 11 of cage 10 to bend. Consequently, retaining hole 11a comes off latch 3 of case 1, thereby releasing the retention of latch 3 by retaining hole 11a.

Figure 8C:
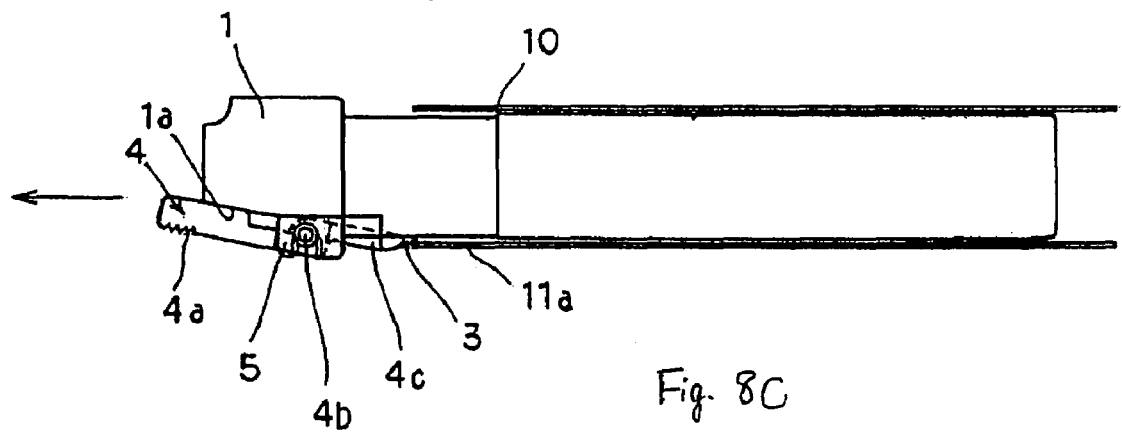

Then, with tongue 4a of lever 4 being held in abutment to lever stopping surface 1a, as case 1 is withdrawn in a direction indicated by an arrow in FIG. 8C, the optical module can be removed from cage 10.

When case 1 is withdrawn from cage 10, actuator 4c of lever 4 acts to force aside spring plate 11 from latch 3, so that latch 3 will never be again fitted into retaining hole 11a while case 1 is being withdrawn from cage 10. Also, as actuator 4c and latch 3 are moved away from the leading end of spring plate 11 after case 1 has been completely withdrawn from cage 10, as illustrated in FIG. 8C, spring plate 11 returns to its original state with its restoring force.

Since actuator 4c of lever 4 has a leading end in a rounded shape, the leading end of actuator 4c smoothly goes beyond the leading end of spring plate 11, even if actuator 4c protrudes from the bottom surface of case 1, when case 1 is inserted into cage 10. Therefore, the leading end of actuator 4c will not collide with spring plate 11 to disable the insertion of case 1 into cage 10.

As described above, the optical module according to this embodiment only requires a single action for a sequence of operations from the release of the retention of latch 3 by retaining hole 11a to the removal of case 1 from cage 10, through simple operations of holding tongue 4a of lever 4 and case 1 together and pulling case 1 in front, thereby making it possible to simplify the operation involved in the removal of case 1 from cage 10.

Further, since the optical module according to this embodiment is designed to unlock case 1 from cage 10 only with lever 4 which is a component thereof, a feature for carrying out the unlocking can be implemented in a relatively simple structure with a less number of components than the conventional optical module.

Also, since the optical module according to this embodiment is designed to make lever 4 movable only in a region forward of case 1, a plurality of cages 10 can be arranged adjacent to one another in the vertical and horizontal directions, thereby making it possible to mount a plurality of optical modules in a device at a higher density.

Further, since the optical module according to this embodiment is designed to push down spring plate 11 of cage 10 by projecting actuator 4c of lever 4 received in recess 6 of case 1, recess 6 may have a depth substantially equal to the thickness of actuator 4c.

Supposing that lever 4 of this embodiment has latch 3 formed on the bottom surface of actuator 4c so that tongue 4a is pushed down to retract actuator 4c deeper into recess 6 to unlock the optical module, recess 6 would have a depth which should be the sum of the thickness of actuator 4c and a stroke over which actuator 4c is retracted. Therefore, in this supposed structure, recess 6 would have to be much deeper, resulting in a smaller thickness of a portion of case 1 which forms recess 6 and an eventual reduction in strength of case 1.

On the other hand, in this embodiment, since recess 6 may have a depth substantially equal to the thickness of actuator 4c, a certain degree of thickness can be ensured for the portion of case 1 which forms recess 6, so that case 1 will not be reduced in strength.

Second Embodiment

Figure 10A:
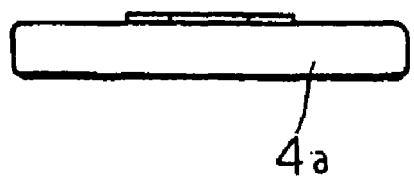
FIGS. 10A-10C are diagrams illustrating a lever shown in FIG. 9.
Figure 10B:
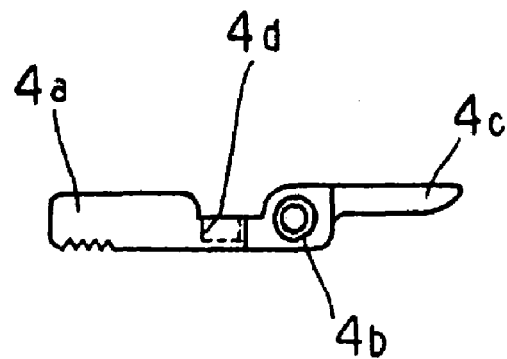
Figure 10C:
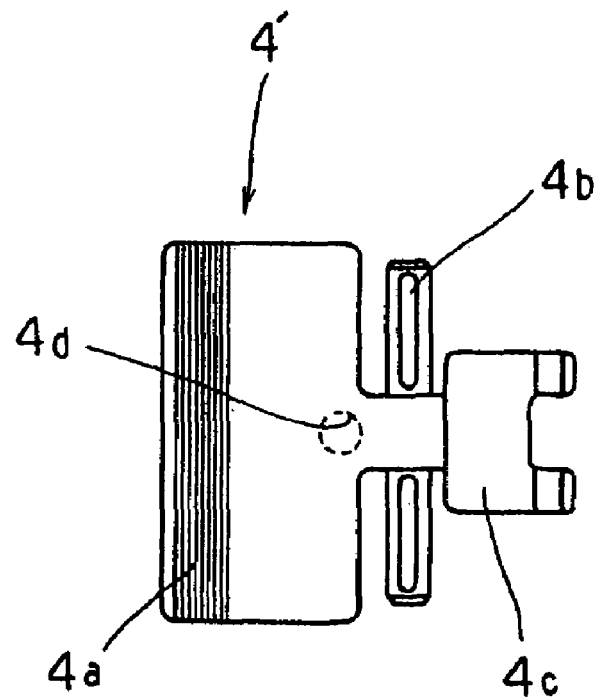

FIG. 9 is a diagram illustrating a second embodiment of the optical module according to the present invention. FIGS. 10A-10C in turn are diagrams illustrating a lever appearing in FIG. 9, wherein FIG. 10A is a left side view of the lever, FIG. 10B is a front view of the same, and FIG. 10C is a bottom view of the same.

Lever 4', which forms part of the optical module according to this embodiment, has cylindrical recess 4d formed on a surface which opposes lever stopping surface 1a of case 1 when the optical module is accommodated in case 1, at a position closer to tongue 4a from shaft 4b. In addition, coil spring 15 is disposed between recess 4d of lever 4' and case 1.

Since the remaining structure of the optical module according to the second embodiment is similar to that of the optical module according to the first embodiment illustrated in FIGS. 2A-2C and the like, detailed description thereon is omitted.

Coil spring 15 has one end fitted in recess 4d of lever 4' in abutment to the top surface of lever 4', and the other end in abutment to lever stopping surface 1a of case 1. Since coil spring 15 illustrated in FIG. 9 is slightly compressed, lever 4' is applied with an urging force in a direction indicated by an arrow in FIG. 9.

Figure 11:
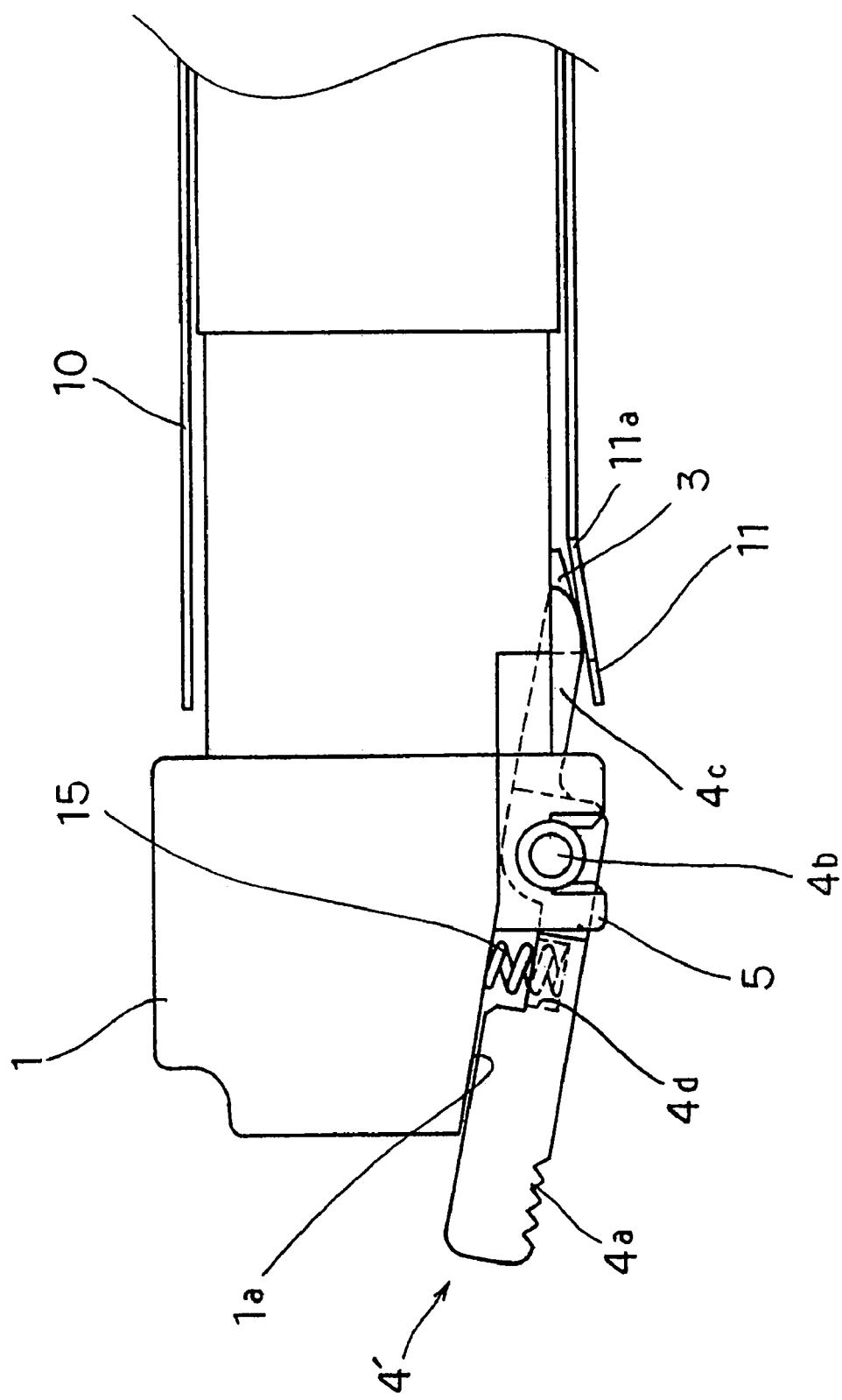
FIG. 11 is a diagram illustrating the optical module shown in FIG. 9 when a latch of a case is released from retention by a retaining hole of a cage.

As tongue 4a is lifted up to cause a pivotal movement of lever 4', coil spring 15 is compressed between recess 4d of lever 4' and lever stopping surface 1a, as illustrated in FIG. 11. Coil spring 15 used in this embodiment generates an urging force just enough to maintain lever 4' in a horizontal posture illustrated in FIG. 9, and therefore a slight force is only required for compressing coil spring 15. As such, the user can lift up tongue 4a to the position indicated in FIG. 11 without substantially feeling a repellent force of coil spring 15.

According to the optical module of the second embodiment, coil spring 15 urges lever 4' in a direction in which tongue 4a of lever 4' is moved away from lever stopping surface 1a. Therefore, in whichever posture the optical module takes, lever 4' is held at the position indicated in FIG. 9 with respect to case 1, so that actuator 4c remains received in recess 6. Thus, actuator 4c is prevented from impinging onto spring plate 11 of cage 10, for example, when the optical module is inserted into cage 10, thereby permitting the user to more smoothly insert the optical module into cage 10.

Third Embodiment

FIGS. 12A-12C are diagrams illustrating a lever in a third embodiment of the optical module according to the present invention, wherein FIG. 12A is a left side view of the lever, FIG. 12B is a front view of the same, and FIG. 12C is a bottom view of the same.

Lever 14 illustrated in FIGS. 12A-12C has tongue 4a of lever 4 illustrated in FIGS. 3A-3C, which is hollowed out to leave the outer periphery thereof. Therefore, tongue 14a of lever 14 is reduced in weight by the hollowed interior, as compared with tongue 4a of lever 4 illustrated in FIGS. 3A-3C.

Since the remaining structure of the optical module according to the third embodiment is similar to that of the first embodiment illustrated in FIGS. 3A-3C and the like, detailed description thereon is omitted.

Since lever 14 has hollow tongue 14a, which has a similar outer shape to tongue 4a of lever 4 illustrated in FIGS. 3A-3C, tongue 14a comes into abutment to optical fiber connectors before it abuts to lever stopping surface 1a when lever 14 is lifted up with the optical fiber cable connectors remaining in connection to connection ports 2a, 2b. For this reason, actuator 14c does not move to a position at which retaining hole 11a of spring plate 11 comes off latch 3, so that the user is prevented from inadvertently operating lever 14 to cause retaining hole 11a to come off latch 3 while connectors are in connection to connection ports 2a, 2b of case 1.

Figure 13A:
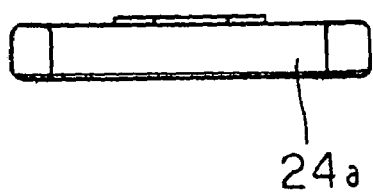
FIGS. 13A-13C are diagram illustrating an exemplary modification to the lever shown in FIGS. 12A-12C.
Figure 13B:
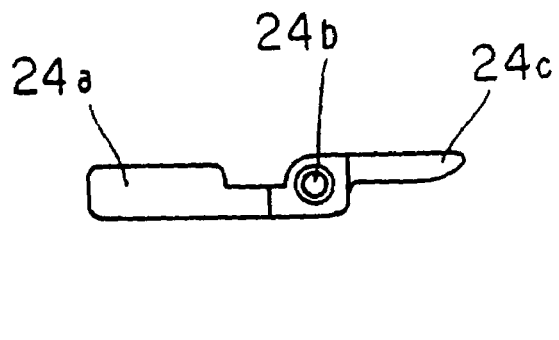
Figure 13C:
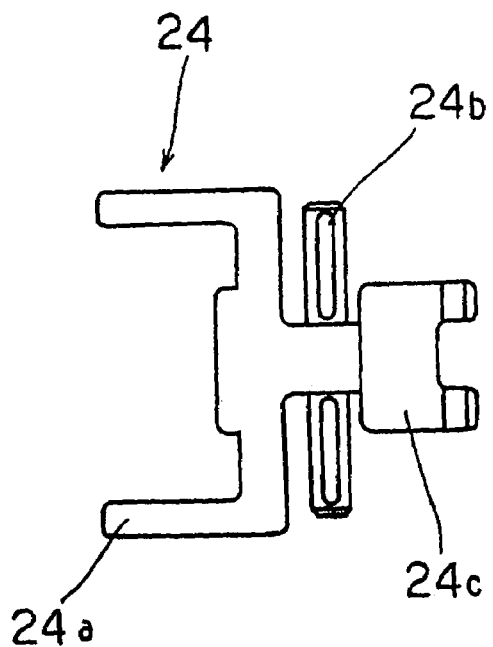

FIGS. 13A-13C are diagrams illustrating an exemplary modification to the lever illustrated in FIGS. 12A-12C, where FIG. 13A is a left side view of the modified lever, FIG. 13B is a front view of the same, and FIG. 13C is a bottom view of the same.

Lever 24 illustrated in FIGS. 13A-13C excludes the beam at the leading end of tongue 14a of lever 14 illustrated in FIGS. 12A-12C. Therefore, lever 24 is further reduced in weight than lever 14 illustrated in FIGS. 12A-12C. Note, however, that unlike levers 4, 14 illustrated in FIGS. 3A-3C and FIGS. 12A-12C, tongue 24a will not come into abutment to optical fiber connectors before it abuts to lever stopping surface 1a even when lever 24 is lifted up with optical fiber cable connectors remaining in connection to connection ports 2a, 2b.

Figure 14A:
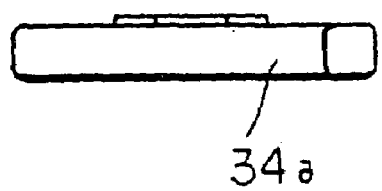
FIGS. 14A-14C are diagram illustrating another exemplary modification to the lever shown in FIGS. 12A-12C.
Figure 14B:
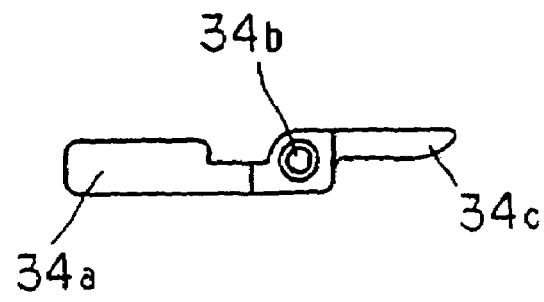
Figure 14C:
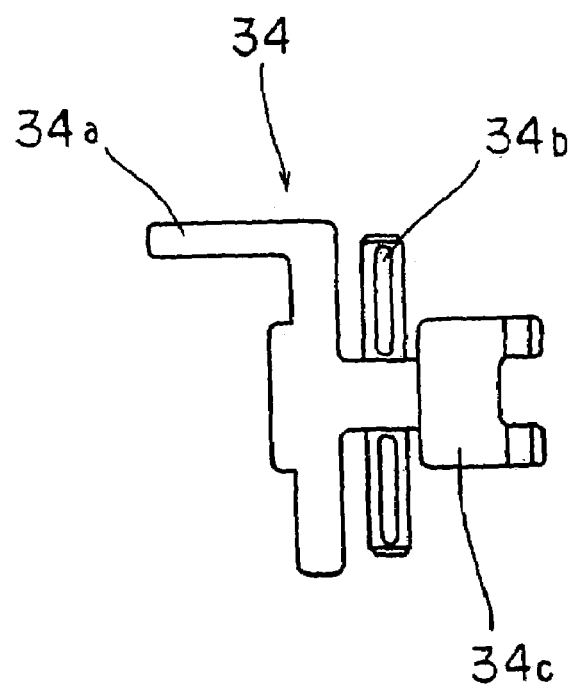

FIGS. 14A-14C are diagrams illustrating another exemplary modification to the lever illustrated in FIGS. 12A-12C, wherein FIG. 14A is a left side view of the modified lever, FIG. 14B is a front view of the same, and FIG. 14C is a bottom view of the same.

Lever 34 illustrated in FIGS. 14A-14C further excludes a beam on one side in tongue 24a of lever 24 illustrated in FIGS. 13A-13C. Therefore, lever 34 is further reduced in weight than lever 24 illustrated in FIGS. 13A-13C. Note, however, that tongue 34a will not either come into abutment to optical fiber connectors before it abuts to lever stopping surface 1a when lever 34 is lifted up with optical fiber cable connectors remaining in connection to connection ports 2a, 2b.

Each of levers 14, 24, 34 illustrated in FIGS. 12A-12C, FIGS. 13A-13C, and FIGS. 14A-14C, respectively, has tongue 14a, 24a, 34a reduced in weight so that the weight ratio of tongue 14a, 24a, 34a to actuator 14c, 24c, 34c is not so high, causing tongue 14a, 24a, 34a to fall by its weight with more difficulties when the optical module is placed in a horizontal posture. For this reason, each of levers 14, 24, 34 in the modified embodiments is preferably formed with a recess in a manner similar to the lever illustrated in FIGS. 10A-10C, with a coil spring disposed between the lever and case 1, such that the lever is urged in a direction in which the tongue is moved away from lever stopping surface 1*a*.

While preferred embodiments of the present invention have been described using specific terms, such description is for illustrative purposes only, and it is to be understood that changes and variations may be made without departing from the spirit or scope of the following claims.

What is claimed is:

1. An optical module comprising:
   a case for containing elements for making optical communications, said case having a latch which is retained in a retaining hole formed through a spring plate possessed by a cage for accommodating said case; and
   a lever for bending said spring plate in a direction in which said retaining hole comes off said latch,
   wherein said lever includes a shaft pivotably supported on said case, a tongue disposed on one side of said shaft, and an actuator disposed on an opposite side of the shaft with respect to said tongue, said lever being configured to make a pivotal movement about said shaft in response to a movement of said tongue toward said case, such that said actuator presses said spring plate to bend in said direction, said lever pivoting about an axis that is perpendicular to a direction of withdrawal of said case from said cage, and
   said latch and said lever are disposed on the same surface of said case, said surface of said case being formed with a lever stopping surface to which said tongue abuts, and
   said lever is configured to move said actuator to a position at which said retaining hole comes off said latch when said tongue comes into abutment to said lever stopping surface.

2. The optical module according to claim 1, wherein:
   said case includes a connection port on a front end surface thereof for connection with a connector which is connected to a cable; and
   said lever is configured such that as said tongue is moved toward said case when said connector is in connection to said connection port, said tongue comes into abutment to said connector to prevent said actuator from moving to a position at which said retaining hole comes off said latch.

3. The optical module according to claim 1, wherein said latch and said lever are arranged on a bottom surface of said case, said tongue having a weight larger than the weight of said actuator.

4. The optical module according to claim 1, further comprising:
   an urging member for urging said lever in a direction in which said tongue is moved away from said case.

5. The optical module according to claim 1, wherein:
   said optical module accommodated in said cage is withdrawn from said cage in a direction forward of a front end surface of said case, and
   said lever is movable over a range within a region forward of the front end surface of said case.

6. The optical module according to claim 5, wherein:
   said lever is movable over a range within a region delimited by an extension of a top surface of said case forward of the front end surface of said case and an extension of a bottom surface of said case forward of the front end surface of said case.

7. An optical module comprising:
   a case for containing elements for making optical communications, said case having a latch which is retained in a retaining hole formed through a spring plate possessed by a cage for accommodating said case; and
   an unlocking member for bending said spring plate in a first direction in which said retaining hole comes off said latch,
   wherein said optical module is configured such that said unlocking member bends said spring plate when said unlocking member is pressed toward said case in a second direction opposite said first direction, causing said retaining hole which retains said latch to come off said latch,
   said unlocking member comprises a lever having a shaft pivotably supported on said case, a tongue disposed on one side of said shaft, and an actuator disposed on the opposite side of the shaft with respect to said tongue,
   said lever is configured to make a pivotal movement about said shaft in response to a movement of said tongue toward said case, such that said actuator presses said spring plate to bend in said direction in which said retaining hole comes off said latch, and
   said case and said tongue can be held together with said tongue being moved close to said case,
   said latch and said lever are arranged on the same surface of said case, said surface of said case being formed with a lever stopping surface to which said tongue abuts, and
   said lever is configured such that said actuator moves to a position at which said retaining hole comes off said latch when said tongue comes into abutment to said lever stopping surface.

8. The optical module according to claim 7, wherein said latch and said lever are arranged on a bottom surface of said case, said tongue having a weight larger than the weight of said actuator.

9. The optical module according to claim 7, further comprising:
   an urging member for urging said lever in a direction in which said tongue is moved away from said case.

10. An optical module comprising:
    a case for containing elements for making optical communications, said case having a latch which is retained in a retaining hole formed through a spring plate possessed by a cage for accommodating said case; and
    an unlocking member for bending said spring plate in a first direction in which said retaining hole comes off said latch,
    wherein said optical module is configured such that said unlocking member bends said spring plate when said unlocking member is pressed toward said case in a second direction opposite said first direction, causing said retaining hole which retains said latch to come off said latch,
    said unlocking member comprises a lever having a shaft pivotably supported on said case, a tongue disposed on one side of said shaft, and an actuator disposed on the opposite side of the shaft with respect to said tongue,
    said lever is configured to make a pivotal movement about said shaft in response to a movement of said tongue toward said case, such that said actuator presses said spring plate to bend in said direction in which said retaining hole comes off said latch, and
    said case and said tongue can be held together with said tongue being moved close to said case, said case includes a connection port on a front end surface thereof for connection with a connector which is connected to a cable, and said lever is configured such that as said tongue is moved toward said case when said connector is in connection to said connection port, said tongue comes into abutment to said connector to prevent said actuator from moving to a position at which said retaining hole comes off said latch.

11. An optical module comprising:

a case for containing elements for making optical communications, said case having a latch which is retained in a retaining hole formed through a spring plate possessed by a cage for accommodating said case; and an unlocking member for bending said spring plate in a first direction in which said retaining hole comes off said latch, wherein said optical module is configured such that said unlocking member bends said spring plate when said unlocking member is pressed toward said case in a second direction opposite said first direction, causing said retaining hole which retains said latch to come off said latch, said unlocking member comprises a lever having a shaft pivotably supported on said case, a tongue disposed on one side of said shaft, and an actuator disposed on the opposite side of the shaft with respect to said tongue, said lever is configured to make a pivotal movement about said shaft in response to a movement of said tongue toward said case, such that said actuator presses said spring plate to bend in said direction in which said retaining hole comes off said latch, and said case and said tongue can be held together with said tongue being moved close to said case, said optical module accommodated in said cage is withdrawn from said cage in a direction forward of a front end surface of said case;

said lever is movable over a range within a region forward of the front end surface of said case, said lever is movable over a range within a region delimited by an extension of a top surface of said case forward of the front end surface of said case and an extension of a bottom surface of said case forward of the front end surface of said case.

12. An optical module comprising:

a case insertable in a cage, which is connected with a connector and has a latch arranged on a predetermined surface of said case, for being retainable in a retaining hole formed through a spring plate possessed by said cage; and a lever, arranged on said predetermined surface, for bending said spring plate in a direction in which said retaining hole comes off said latch, said lever comprises a shaft pivotably supported on said predetermined surface, a tongue, disposed on one side of said lever, has a leading edge projecting past an end surface of said case and an actuator is disposed on an opposite side of said lever, wherein said leading edge comes into abutment with said connector to prevent said lever from moving to a position at which said retaining hole comes off said latch.

\* \* \* \* \*